United States Patent [19]

Stojic

[11] Patent Number: 5,526,732

[45] Date of Patent: Jun. 18, 1996

[54] SPRING BRAKE ACTUATOR AND REACTION PLATE ANCHOR

[75] Inventor: Steven M. Stojic, Holland, Mich.

[73] Assignee: NAI Anchorlok, Inc., Muskegon, Mich.

[21] Appl. No.: 295,778

[22] PCT Filed: May 17, 1994

[86] PCT No.: PCT/US94/05542

§ 371 Date: Feb. 10, 1995

§ 102(e) Date: Feb. 10, 1995

[87] PCT Pub. No.: WO95/31363

PCT Pub. Date: Nov. 23, 1995

[51] Int. Cl.⁶ .................................................. F01B 7/00
[52] U.S. Cl. .............................. 92/63; 92/128; 403/225
[58] Field of Search ............................. 92/48, 63, 130, 92/128; 403/225, 291, 370

[56] References Cited

U.S. PATENT DOCUMENTS 3,548,720  12/1970  Swander, Jr. .................................. 92/63
3,625,117  12/1971  Tazelarr ........................................ 92/63
3,861,815   1/1975  Landaeus ................................... 403/370

FOREIGN PATENT DOCUMENTS 575020   1/1946   United Kingdom ................... 403/225

Primary Examiner—Thomas E. Denion
Attorney, Agent, or Firm—Varnum, Riddering, Schmidt & Howlett

[57] ABSTRACT

An anchor 100 is provided for anchoring a reaction plate 62 to an actuator rod 60 in a spring brake actuator 10 having a tubular actuator rod 60. The anchor 100 comprises an expandable plug 102 received within an interior space of the actuator rod 60, a bolt 110 extending from the reaction plate 62 through the plug 102 and a washer 108 having a threaded central aperture 81 threaded onto the bolt 110 whereby the plug 102 is compressed between the washer 108 and the reaction plate 62 to expand into engagement with an interior wall 120 of the actuator rod 60. Preferably, the plug 102 is formed of an elastomeric material.

7 Claims, 2 Drawing Sheets

5,526,732

SPRING BRAKE ACTUATOR AND REACTION PLATE ANCHOR

BACKGROUND OF THE INVENTION

1. Field of the Invention

This invention relates to a spring brake actuator. More specifically, the invention relates to a spring brake actuator having a hollow actuator rod and an improved anchor for mounting a reaction plate to the actuator rod.

2. State of the Prior Art

An air brake system for a vehicle such as a bus, truck or the like typically includes a brake shoe and drum assembly which is actuated by means of an actuator assembly operated by the selective application of a fluid such as compressed air. Conventional air brake actuators have both a service brake actuator for actuating the brakes under normal driving conditions by the application of compressed air and an emergency or spring brake actuator which causes actuation of the brakes when air pressure has been released. The emergency brake actuator includes a strong compression spring which forces application of the brake when air is released. This is often referred to as the spring brake. Typically, the spring brake actuator is disposed in tandem with the service brake actuator.

When full pressure is applied to the spring brake actuator, air pressure acting against a diaphragm and a pressure plate compresses the spring. In many applications, a spring brake actuator rod is held in a retracted position by a relatively small return spring. In newer applications, the spring brake actuator rod is integral with the pressure plate and held in a retracted position by the air pressure. In both designs, the spring brake actuator rod thus does not affect the normal operation of the brake.

Depressing the brake pedal during normal driving operation introduces compressed air into the service brake actuator which, acting against a diaphragm, causes a service brake push rod to be extended and the brakes to be applied with an application force proportional to the air pressure in the service brake actuator. In the event of a loss of air pressure or an intentional exhaustion of air from the spring brake actuator, the brake will be mechanically activated by the force of the strong compression spring acting on the spring brake actuator rod which, in turn, acts upon the service brake push rod to apply the brakes. Thus, the spring brake portion serves both as a parking brake and an emergency brake.

U.S. Pat. No. 5,105,727 to Bowyer, issued Apr. 21, 1992, discloses a known spring brake assembly which includes both a spring brake portion and a service brake portion. The service brake portion includes an air chamber partially defined by a flexible diaphragm acting against a service brake push rod and a return spring to assure proper release of the brake when air is exhausted from the air chamber. The spring brake portion also includes an air chamber comprising a spring brake housing and a spring brake actuating rod formed integral with a spring brake pressure plate and secured to the spring brake diaphragm. The spring brake diaphragm is provided with a centrally disposed aperture and engages the actuating rod and pressure plate to form an airtight seal. A strong power spring acts between an end of the spring brake housing and the pressure plate, and tends to urge the actuating rod out of the air chamber to engage the diaphragm and push rod of the service brake and to cause the brake to be applied. During normal operation, the spring force is counteracted by air pressure inside of the spring brake air chamber which acts against the diaphragm to compress the power spring, retracting the actuating rod. When system air pressure is lost, or manually released, the power spring extends to apply the brakes.

The actuating rod is hollow and provided with a central bore. The proximal end (nearest the spring brake housing) of the actuating rod is partially closed by an inwardly directed annular flange on a pressure plate. A brake releasing caging bolt extends into the central bore from outside of the spring brake housing and has an end plate for engaging the annular flange. The bolt is threaded and extends out of the actuating rod, through an aperture in the spring brake housing, through a threaded nut, and terminates in a bolt head.

The opposite end of the actuator rod in the service chamber terminates in a reaction plate. In brake actuators employing solid actuator rods, it is known to attach the reaction plate to the actuator rod by welding or by threading a bolt through an aperture in the reaction plate and into a threaded hole in the end of the actuator rod. A problem, however, is present in connecting a hollow actuator rod, such as that disclosed in the Bowyer U.S. Pat. No. 5,105,727, to the reaction plate.

SUMMARY OF THE INVENTION

The present invention provides an improved connector which attaches a reaction plate to an end of a hollow actuator rod in a spring brake actuator and which also seals the end of the actuator rod.

In a spring brake actuator according to the invention, a housing has first and second end walls defining a housing interior, with an aperture through the first end wall. An elastomeric diaphragm suspended within the housing divides the housing interior into a first chamber and a second chamber. A tubular actuator rod operably connects to the diaphragm for reciprocating movement relative to the housing. The actuator rod has a first end extending into the opening in the first end wall and an interior surface defining an actuator rod interior space. A spring is disposed within the second chamber between the second end wall and the diaphragm. A reaction plate connects to the actuator rod first end.

An improvement to the spring brake actuator comprises an anchor for anchoring the reaction plate to the actuator rod first end. The anchor comprises an expandable plug received within the actuator rod interior space at the actuator rod first end, a threaded receptacle on the plug, and a threaded bolt extending from the reaction plate into the plug and the threaded receptacle. Upon introduction of the plug into the actuator rod, rotation of the bolt causes the plug to expand radially into frictional abutment with the actuator rod interior surface to securely retain the plug within the actuator rod interior space and anchor the reaction plate to the actuator rod.

Preferably, the plug is elastomeric and the threaded receptacle is a washer. Threading the bolt into the washer compresses the plug between the washer and the reaction plate. The reaction plate also preferably comprises a first side in abutment with the plug, an opposite second side, and an aperture extending through the reaction plate from the second side to the first side. The bolt is received within the aperture with a head on the bolt in abutment with the reaction plate at the reaction plate second side with the bolt extending outwardly from the reaction plate first side into the plug. The aperture can be countersunk into the reaction plate second side so that the bolt head is completely received within the countersunk aperture.

A method, according to the invention, for securing a reaction plate to a tubular actuator rod adapted for use in a spring brake actuator comprises the steps of mounting an expandable plug to the reaction plate, inserting the plug into an open end of the tubular actuator rod, and expanding the plug into frictional engagement with the interior surface of the actuator rod.

DETAILED DESCRIPTION OF THE DRAWINGS

Figure 1:
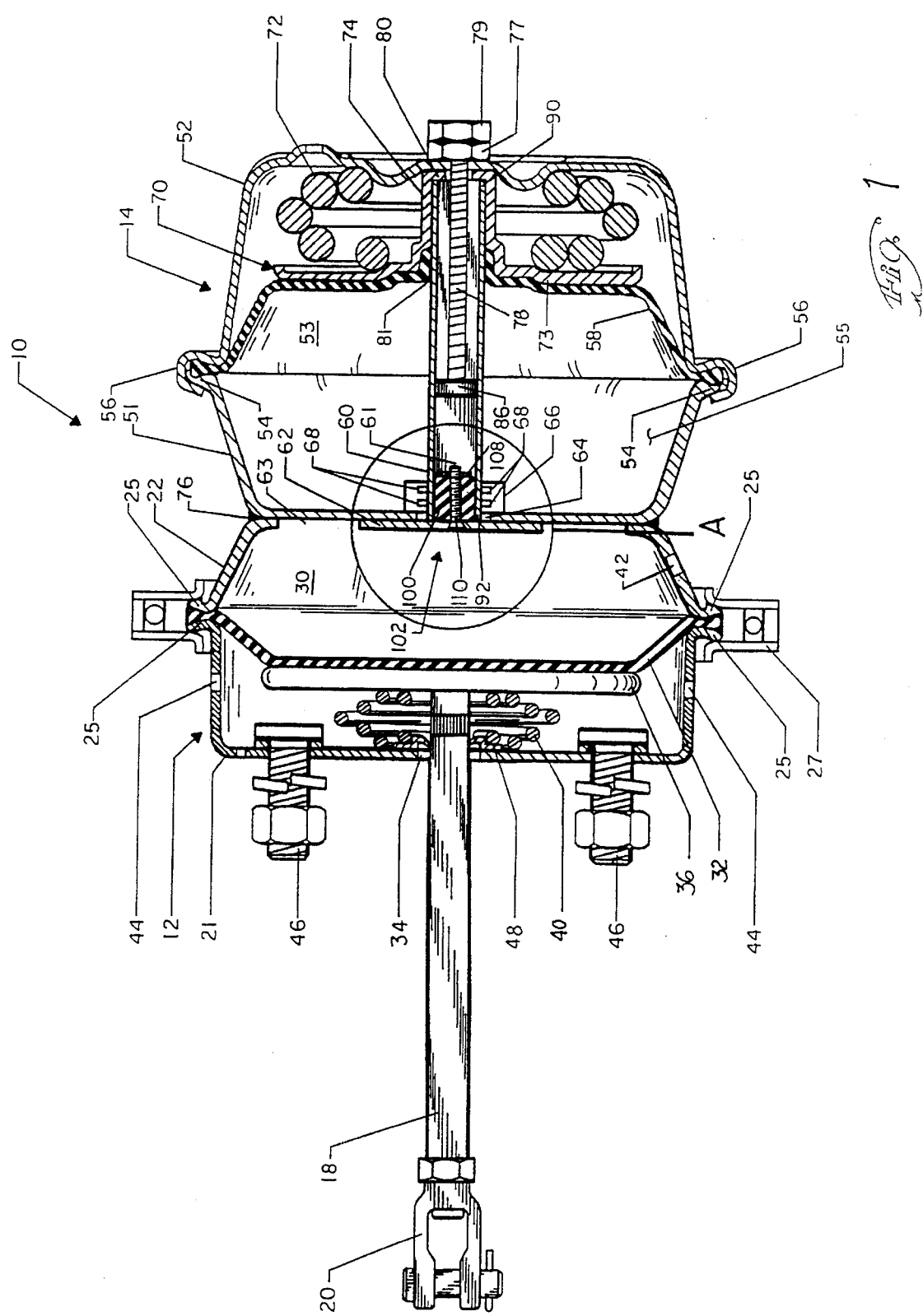
FIG. 1 is a cross-sectional view of an air-operated brake actuating assembly in accordance with the principles of this invention.

Referring to the drawings and to FIG. 1 in particular, a cross-sectional view of an air-operated brake actuating unit 10 having a general configuration well known in the art is illustrated. The actuating unit 10 comprises a service brake portion 12 mounted in tandem to a spring brake or emergency brake portion 14. A service brake push rod 18 extends from the service brake 12 for reciprocating motion and is provided with a clevis 20 which is adapted to connect to a conventional brake system (not shown) in a standard fashion. Reciprocating motion of the push rod 18 will cause the brake to be alternately applied and released.

The service brake 12 comprises a pair of facing cup-shaped housing sections 21 and 22, each having an outwardly directed flanged edge 25. The housing sections 21 and 22 are clamped together at their flanged edges by means of a clamp 27 to form a service brake inner chamber 30. An elastomeric diaphragm 32 is suspended within the inner chamber 30 and is compressed at the peripheral edge thereof between ranged edges 25 of the housing sections 21 and 22. The service brake push rod 18 extends through a central opening 34 in housing section 21 and into the service brake chamber 30 where it terminates in a pressure plate 36. A compression spring 40 extends between pressure plate 36 and the interior surface of the housing section 21. A spring seat 48 is disposed around the central opening 34 to receive the end of the compression spring 40 and retain it in position around the opening 34. The spring 40 thus urges the pressure plate 36 and the service brake push rod 18 to a fully retracted position To operate the service brake, compressed air is introduced through an air service port 42 in housing section 22 to force the diaphragm 32 and pressure plate 36 against the force of spring 40 to actuate the push rod 18. Openings 44 are provided in the housing section 21 to allow for the rapid evacuation of air from the inner chamber 30. Mounting studs 46 are provided to mount the brake actuating unit 10 onto a brake bracket.

The spring brake 14 comprises a pair of facing cup-shaped housing sections 51 and 52 joined at their edges to form an inner chamber 53. Housing section 51 is provided with an outwardly directed circumferential flanged edge 54. The housing sections 51 and 52 are clamped together by means of a peripheral curved edge 56 on housing section 52 engaging edge 54 on housing section 51. An elastomeric diaphragm 58 is suspended within the spring brake chamber 53 and is compressed at its peripheral edge between the edges 54, 56 of housing sections 51 and 52. The portion of the chamber 53 between the diaphragm 58 and housing section 51 forms a pressure chamber 55 which is filled with compressed air supplied through an air service port (not shown) in housing section 51 when the emergency brake is in its normal released position.

An actuator rod 60, aligned with push rod 18, has a first end 90 extending through a central opening 64 in an end wall of housing section 51. A second end 92 of the actuator rod 60 terminates in a reaction plate 62 disposed in an aligned central opening 63 in an end wall of housing section 22. Opening 64 is provided with a bearing 66 having annular recesses to accommodate a pair of O-ring seals 68. Bearing 66 forms a bearing surface and an airtight seal for actuator rod 60. The other end of the actuator rod 60 extends through a centrally disposed aperture 81 in the diaphragm 58 and terminates in a pressure plate 70 which engages a powerful compression spring 72. The pressure plate 70 comprises a substantially flat portion 73 engaging one end of the spring 72 and a tubular portion 74 extending generally axially along the axis of spring 72. The tubular portion 74 is press-fit onto an end portion of actuator rod 60 such that the pressure plate 70 and the rod 60 form an integral unit. The pressure plate 70 may be formed of cast aluminum.

During normal operation of the brake 10, the actuator rod 60 will be in the fully withdrawn position by means of compressed air which is maintained in the pressure chamber 55. However, in the event that system pressure is lost, either accidentally or due to manual release, the compressed air will escape from the pressure chamber 55 allowing the spring 72 to extend the actuator rod 60. When the compressed air is exhausted, compression spring 72, one end of which engages the outer end wall of housing section 52, forces the pressure plate 70 and rod 60, integrally attached to the pressure plate, in the direction of the brake push rod 18 of the service brake 12. The housing section 22 of the service brake 12 and housing section 51 of the spring brake 14 may be steel shells attached to each other by means of a circumferentially extending weld bead 76 or other suitable attachment means or can be an integral aluminum casting. The force of spring 72 causes actuator rod 60 to be extended through the central opening 64 and causes the reaction plate 62 to apply a force to the diaphragm 32 and pressure plate 36 of the service brake 12. This action causes the service brake push rod 18 to be actuated and the brake to be applied. When the brake is to be released, compressed air is once again introduced in the space between housing section 51 and diaphragm 58. The force of the compressed air against diaphragm 58 causes pressure plate 70, rod 60 and spring 72 to be returned to the position depicted in FIG. 1.

The actuator rod 60 is a hollow tube or rod provided with a central bore 61 to accommodate a brake release or caging bolt 78. The bolt 78 is adapted to engage an end edge 80 of the tubular portion 74 of pressure plate 70 to maintain the spring 72 in a compressed position whenever such is desired. The bolt 78 may be used to manually release the spring brake or to ensure that the compression spring 72 will remain compressed when maintenance functions are performed on the brake assembly. The bolt 78 is threaded and engages a fixed threaded opening or nut such as nut 77 affixed by welding or staking to the end wall of housing section 52. A second nut or head 79 is fixedly attached to the threaded bolt such that the bolt may be rotated in nut 77 by a common wrench or the like.

The end edge 80 provides positive engagement with the walls of actuator rod 60 when the rod is actuated and further serves as an engagement surface for a shoulder or end plate 86 of the caging bolt 78. Plate 86 engages the edge 80 when the bolt 78 is withdrawn to retain the compression spring 72 in its compressed state. Otherwise, the bolt 78 extends into the central bore 61 of actuator rod 60 by a sufficient distance to allow the actuator rod 60 to extend to its full length of travel without engagement between the edge 80 and reaction plate 86.

Figure 2:
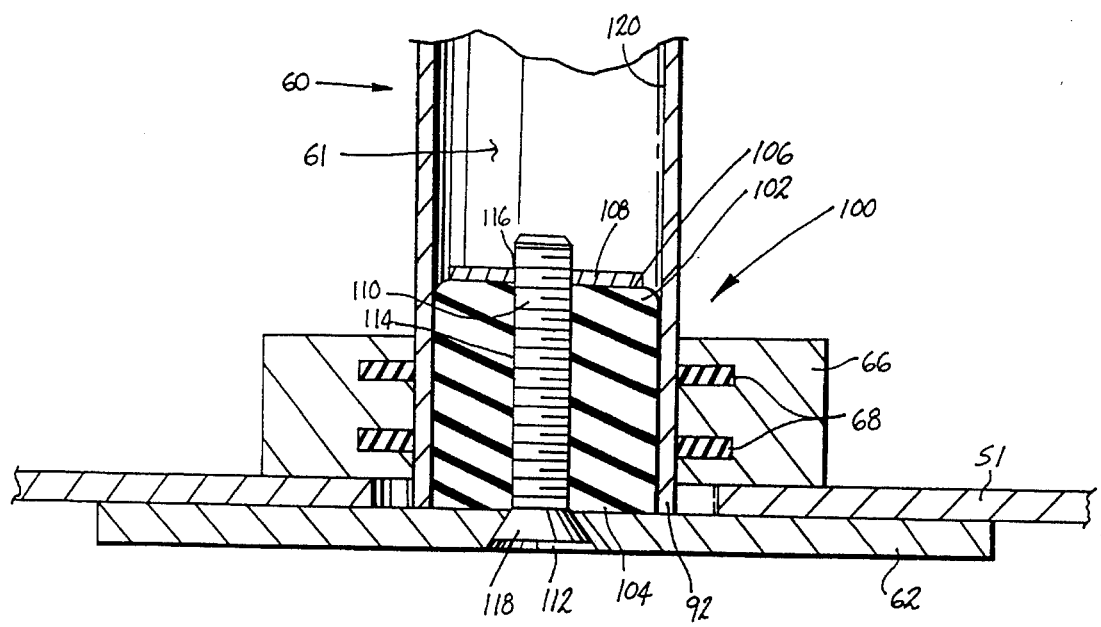
FIG. 2 is a partial sectional view of the spring brake actuator of FIG. 1 illustrating a connector for attaching a reaction plate to an end of an actuator rod.

Turning to FIG. 2, an anchor 100 is illustrated for anchoring the reaction plate 62 to the actuator rod second end 92. The anchor 100 comprises a cylindrical plug 102 of elastomeric material, such as rubber, sized to fit easily into the actuator rod bore 61 at the actuator rod second end 92. A first end 104 of the plug 102 abuts the reaction plate and a second end 106 of the plug 102 carries a threaded washer 108. A threaded bolt 110 passes through a central aperture 112 in the reaction plate 62, through a central coaxial aperture 114 in the plug 102 and is threadably received within a threaded central aperture 116 in the threaded washer 108. Preferably, the reaction plate aperture 112 is countersunk to receive a slotted head 118 of the bolt 110. The washer 108 can be provided with means for restraining rotation of the washer 108 relative to the plug 102 to facilitate tightening the bolt 110. Such means can include bonding or staking the washer 108 to the plug 102 or texturing the surface of the washer 108. It will be apparent that when the bolt 110 is tightened, the plug 102 is compressed between the washer 108 and the reaction plate 62, thereby also compressing the plug against the interior wall 120.

To assemble the reaction plate 62 to the actuator rod second end 92, the bolt 110 is received in the aligned apertures 112, 114 and 116 in the reaction plate 62, plug 102 and washer 108. The bolt 110 is tightened in the washer aperture 116 so that the washer 108 abuts the plug 102 without compressing the plug 102. If the diameter of the plug 102 is less than the internal diameter of the actuator rod second end 92, then the washer 108 and bolt 110 can be tightened to slightly compress the plug 102. Ordinarily, additional means to restrain rotation of the washer 108 relative to the plug 102 will not be necessary because friction between the two will provide sufficient restraint. The plug 102 is then inserted into the actuator rod bore 61 at the actuator rod second end 92 and the bolt 110 is tightened to further compress the plug 102. Friction between the radially expanded plug 102 and an interior wall 120 defining the actuator rod central bore 61 firmly holds the plug 102 therewithin. Preferably, the holding force resulting from the friction between the plug 102 and actuator rod interior wall 120 will be sufficient to withstand any back pressure that may occur within the actuator rod bore 61. The plug also seals the actuator rod second end 92 to prevent communication between the actuator rod bore 61 and the pressurized service brake chamber 30.

While particular embodiments of the invention have been shown, it will be understood that the invention is not limited thereto since modification can be made by those skilled in the an, particularly in light of the foregoing teachings. Reasonable variation and modification are possible within the foregoing disclosure of the invention without departing from its true spirit and scope. For example, other means can be provided for expanding the plug 102 radially into abutment with the actuator rod inner wall 120, such as substituting an expansion member within the plug 102 for the washer 108. While the plug 102 advantageously both seals the actuator rod second end 92 and expands to hold the reaction plate 62 thereto, separate members could be provided for sealing and expansion. It is to be understood that this description of the particular embodiments contained herein is by way of illustration and not limitation, and the scope of the appended claims should be construed as broadly as the prior an will permit.

I claim:

1. In a spring brake actuator comprising:

a housing having first and second end walls defining a housing interior, the first end wail having an aperture therethrough;

an elastomeric diaphragm suspended within the housing and dividing the interior thereof into a first chamber and a second chamber;

a tubular actuator rod operably connected to the diaphragm for reciprocating movement relative to the housing, having a first end extending into the opening in the first end wall, and having an interior surface defining an interior space;

a spring disposed within the second chamber between the second end wall and the diaphragm; and a reaction plate connected to the actuator rod first end;

the improvement comprising:

an anchor for anchoring the reaction plate to the actuator rod first end, the anchor comprising an expandable plug received within the actuator rod interior space at the actuator rod first end, a threaded receptacle on the plug, and a threaded bolt extending from the reaction plate into the plug and the threaded receptacle, whereby upon introduction of the plug into the actuator rod, rotation of the bolt will cause the plug to expand radially into frictional abutment with the actuator rod interior surface to securely retain the plug within the actuator rod interior space and anchor the reaction plate to the actuator rod.

2. A spring brake actuator according to claim 1 wherein the plug is elastomeric; and the threaded receptacle is a washer, the bolt being threadably received by the washer, the plug being compressed between the washer and the reaction plate.

3. A spring brake actuator according to claim 2 wherein:

the reaction plate comprises a first side in abutment with the plug, an opposite second side and an aperture extending through the reaction plate from the second side to the first side;

the bolt further comprises a head, the bolt being received within the aperture with the bolt head on the reaction plate second side in abutment with the reaction plate and the bolt extending outwardly from the reaction plate first side into the plug.

4. A spring brake actuator according to claim 3 wherein the aperture is countersunk into the reaction plate second side and the bolt head is completely received within the countersunk aperture.

5. A method for securing a reaction plate to a tubular actuator rod adapted for use in a spring brake actuator, the method comprising the steps of:

mounting an expandable plug to the reaction plate;

inserting the expandable plug wholly into an open end of the tubular actuator rod until the reaction plate abuts the tubular actuator rod; and expanding the plug to frictionally engage an interior surface of the actuator rod.

6. A method according to claim 5 and further comprising the steps of:

providing a washer on one side of the expandable plug, said washer having a threaded central aperture and an outer diameter not greater than an outer diameter of the plug in its unexpanded state;

passing the bolt from the reaction plate on an opposite side of the plug through the plug and threading the bolt into the washer threaded central aperture; and compressing the plug by tightening the bolt within the washer threaded central aperture to expand the plug radially into frictional abutment with the actuator rod interior surface.

7. A method according to claim 6 and further comprising the steps of:

countersinking an aperture into one side of the reaction plate and extending the aperture through the reaction plate to an opposite second side;

providing a head on the bolt;

inserting the bolt into the countersunk aperture with the bolt head completely received within the countersunk aperture and abutting the reaction plate first side; and extending the bolt through the reaction plate second side and into the plug.

\* \* \* \* \*